Figure 1:
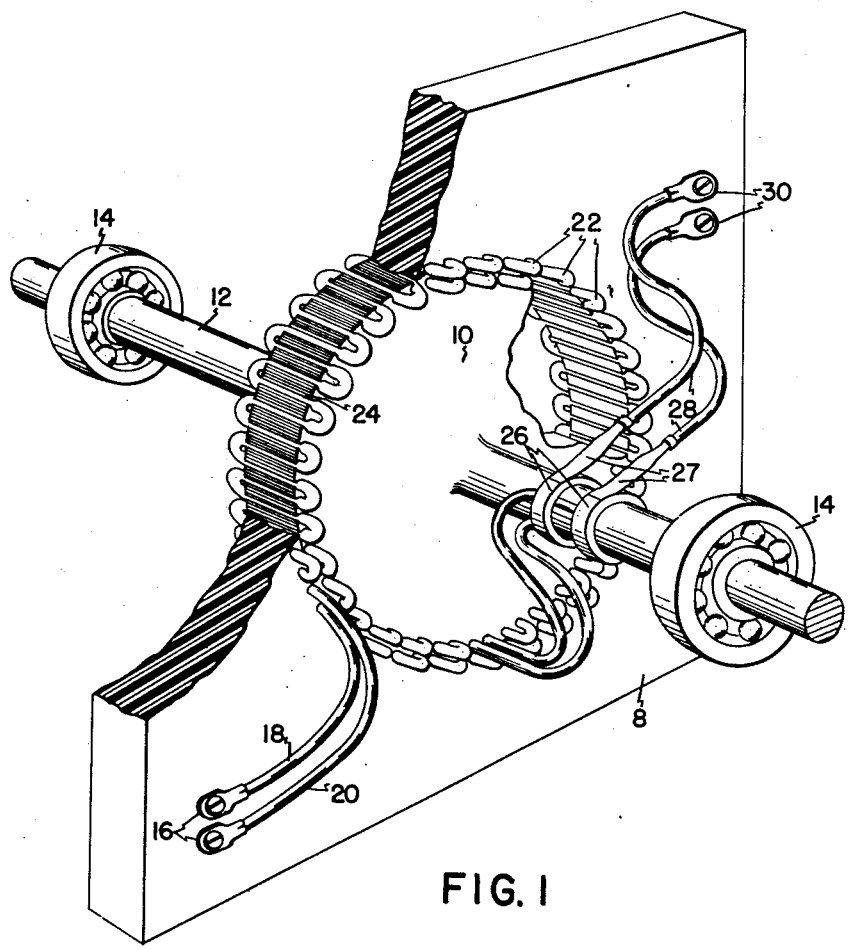

Aug. 25, 1953        R. S. CHILDS        2,650,352
VARIABLE INDUCTANCE FOR MEASURING MOTION
Filed Dec. 27, 1947                      3 Sheets-Sheet 1

INVENTOR.
ROBERT S. CHILDS
BY
ATTORNEYS

Aug. 25, 1953  R. S. CHILDS  2,650,352
VARIABLE INDUCTANCE FOR MEASURING MOTION
Filed Dec. 27, 1947  3 Sheets-Sheet 2

INVENTOR.
ROBERT S. CHILDS
BY
ATTORNEYS

Aug. 25, 1953     R. S. CHILDS     2,650,352
VARIABLE INDUCTANCE FOR MEASURING MOTION
Filed Dec. 27, 1947     3 Sheets-Sheet 3

INVENTOR.
ROBERT S. CHILDS
BY
ATTORNEYS

Patented Aug. 25, 1953

2,650,352

UNITED STATES PATENT OFFICE 2,650,352

VARIABLE INDUCTANCE FOR MEASURING MOTION

Robert S. Childs, South Sudbury, Mass., assignor, by mesne assignments, to Edward G. Martin, Cambridge, Mass.

Application December 27, 1947, Serial No. 794,192

13 Claims. (Cl. 336—123)

1

The present invention relates to measuring apparatus and is more particularly concerned with apparatus functioning in the manner of self-synchronous devices. As is well known self-synchronous devices are ordinarily used to produce electrical signals as a function of angle. The apparatus of the present invention is similarly useful and may be employed wherever an electrical signal as a function of a precision measurement is required.

Existing self-synchronous devices are limited to accuracies of about five minutes of arc. These limitations are largely due to the relatively small number of physical angular divisions and to the variations in magnetic coupling because of the required use of a ferromagnetic core. In addition there are the usual mechanical inaccuracies such as may arise, for example from eccentricity of the rotor mounting and the like.

The principal object of the present invention is to provide a measuring device which is inherently of high accuracy and which avoids the difficulties of the conventional self-synchronous devices.

With this object in view, the present invention comprises two relatively movable members, each of which is wound with a single zig-zag loop of conducting material. Each member comprises a non-magnetic support on which the single loop is placed. This avoids the error due to variations in magnetic coupling which arise in any ferromagnetic structure.

The actual construction of the present invention may take several forms. The invention is applicable either to linear or angular measurements. For a linear measuring device, the loops are placed on members arranged for relative sliding movement. For a rotary device, the loop may be threaded back and forth through a drumlike structure; the individual "bars" which thread back and forth across the rotor and stator are therefore in variable angular relation with one another as the rotor is moved. A half cycle occurs upon motion of the stator through the pitch between two successive bars.

Another form of construction, which may be considered preferable for many reasons, comprises a metallized deposit which forms the loop for each member. The metallized deposit may be made either mechanically or photographically, and in either case an extremely accurate deposit of several thousand conductor bars may be made on parts of relatively small size. For an angular measuring device, it is possible to use rotors which comprise simple disks of insulating material

2

(preferably glass) so that the apparatus may be readily made and will be of an inherently rugged construction.

In any of these constructional forms, the invention has the advantage that it avoids any errors due to eccentricity or other mechanical inaccuracies. This is due to the fact that each bar of one member can be considered analogous to the graduations of a scale disk and each bar of the other member may be considered as a scale index. It is well known that mechanical inaccuracies may be reduced by increasing the number of scale points at which readings are taken. Since there may be several thousand graduations, mechanical inaccuracies will be minimized to the point where they may be completely neglected.

Other features of the invention consist of certain novel features of construction, combinations and arrangements of parts hereinafter described and particularly defined in the claims.

Figure 2:
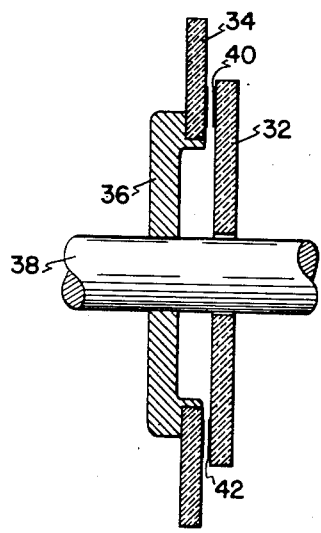
Figure 3:
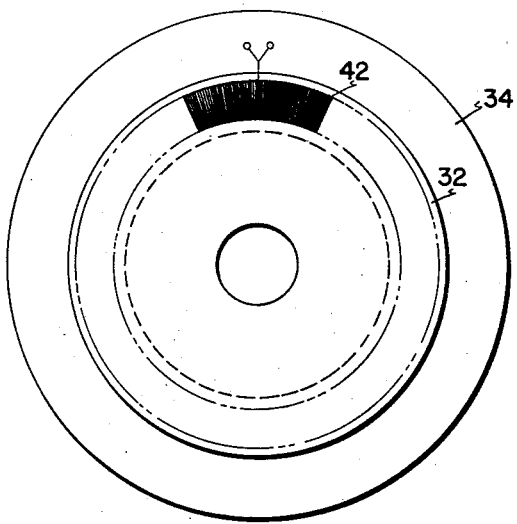
Figure 4:
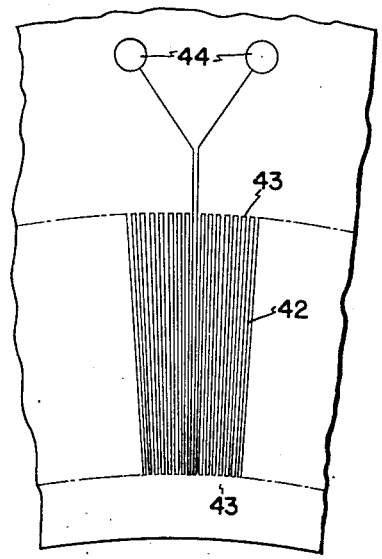
Figure 5:
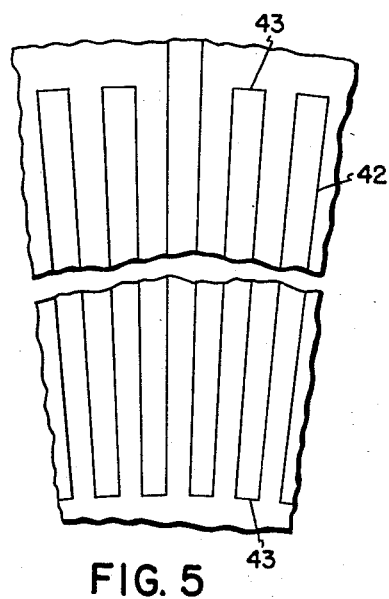
Figure 6:
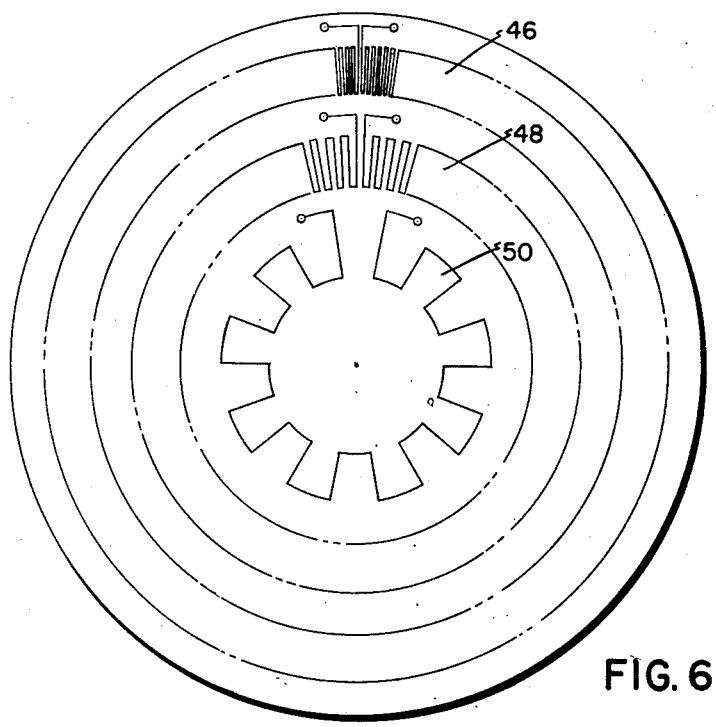
Figure 7:
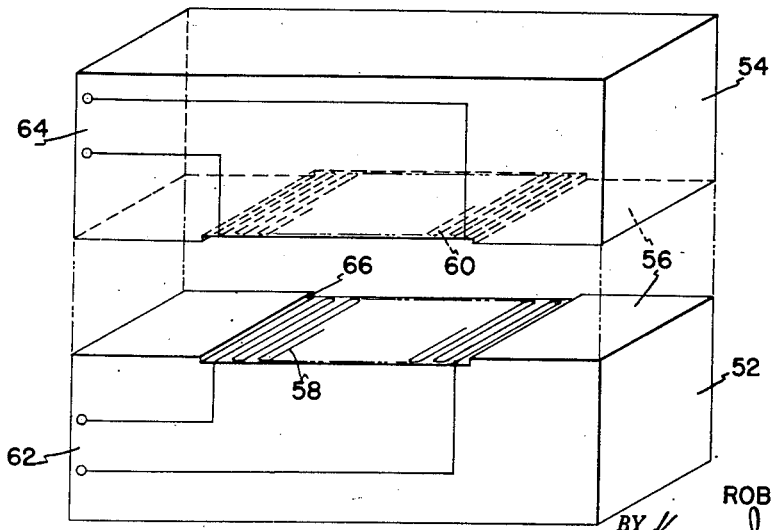

In the accompanying drawings Fig. 1 is a perspective view, partly in section, of one form of rotary apparatus according to the present invention; Fig. 2 is an elevation of another and preferable form of the invention; Fig. 3 is a side elevation of the apparatus of Fig. 2; and Fig. 4 is a detail view on an enlarged scale of a portion of the rotor; Fig. 5 illustrates an even further enlargement; Fig. 6 is a view showing a device for absolute angular measurement; and Fig. 7 is a perspective view of a linear device according to the present invention.

In the structure shown in Fig. 1 the stator comprises a block of insulating material 8, preferably of plastic and a rotor 10 of similar material. The rotor is mounted on a shaft 12 which is accurately journaled in bearings 14. The stator is accurately drilled with closely spaced openings around the periphery of the rotor space and a single conductor is threaded back and forth through the openings. The conductor is shown as connected to terminals 16 and includes the leads 18 and 20. By the zig-zag or criss-cross threading of the loop there is formed a succession of accurately spaced series-connected conductor "bars" 22. It will be noted that this conductor differs from the usual windings of rotating machinery, in that the successive bars are placed in adjacent "slots" of the stator.

The rotor is similarly drilled with the same angular spacing and a single conductor is threaded back and forth through the rotor openings to form the series-connected bars 24. The ends of the loop are connected to slip rings 26 which lead through brushes 27 and suitable connectors 28 to the terminals 30. It will be understood that a suitable capacitive coupling between the rotor and the stationary connectors may be used instead of brushes and slip rings. As shown in Fig. 1, the bars are placed as close as possible to the surface of the stator or rotor opening so that the stator and rotor bars are separated by a minimum air gap, preferably not more than 0.005 inch.

It will be understood that, because of the limitations of illustration, it has been possible to show only a relatively small number of conductor bars in the drawing. Actually, by using a rotor of approximately six inches diameter, it is possible to use 0.01 inch diameter wire, and by accurate machining obtain about a thousand individual bars in each conductor.

The apparatus is operated by impressing an alternating current on the terminals of one conductor, say the terminals 16 of the stator. Preferably the impressed voltage is at radio frequency in order that adequate transformer action may be obtained without the use of a magnetic core. A signal is induced in the rotor conductor, and its magnitude depends on the relative positions of the stator and rotor bars. Motion of the rotor through one bar pitch will carry the induced voltage through a half-cycle. Thus, if the bars are initially in exact alignment on stator and rotor and a signal is impressed on the stator, the induced voltage in the rotor will be at its maximum. On motion through one-half a bar pitch, the signal will drop to zero, and upon continuing motion in the same direction through another half-pitch the induced voltage will rise to its maximum in the reverse phase. Accordingly, if there are a thousand bars in each loop, motion of a thousandth revolution will result in a half-cycle variation in the voltage at the rotor terminals. The variation is substantially a sinusoidal function of angular displacement. The electrical measurement of induced voltage may be readily made to $\frac{1}{500}$ of a cycle; thus the angular measurement in this case may be read to a precision of about five seconds of arc.

Before describing the construction of Figs. 2 to 4 attention will be directed to the inherent accuracy of the structure shown in Fig. 1. As heretofore noted, the magnetic circuits include only effective air paths, so that they always have the same reluctance, regardless of angular position. This avoids one troublesome source of inaccuracy in the usual synchro. Furthermore, the angular divisions may be made as fine as constructional facilities permit. This reduces the question of precision to one of mechanical inaccuracies, the most important of which is the eccentricity of the rotor. It will be understood that an eccentricity of even 0.001 inch will introduce a substantial angular error if only a single scale index is used. This has been well recognized in the art of precision angular measurement and it has been customary to provide at least two diametrically opposed indexes and in many cases, four or more. It can be shown that the mechanical inaccuracies are reduced as a function of the number of scale indexes which are used. In the present case each stator bar may be considered a scale index; hence in the example above chosen there are therefore 1,000 indexes, whereby the inaccuracies due to eccentricity or other mechanical effects are reduced to negligible value. It may therefore be said that the device of the present invention is completely selective to angular motion but not to translation.

The construction shown in Figs. 2 to 4 is similar in principle to that previously described but is simpler in construction and provides for an even finer division of the angular scale. As shown in Fig. 2, the stator comprises a disk 32 and the rotor comprises a disk 34. The disks are preferably of glass and are arranged face to face with as small an air gap as possible. The rotor is suitably mounted on a hub or spider 36 which in turn is mounted on a shaft 38. The stator carries a deposited metal conductor indicated by heavy lines 40 in Fig. 2 and the rotor carries a deposit 42 which is opposed to the deposit 40.

As shown in Fig. 3 and in enlarged views in Figs. 4 and 5, the rotor deposit comprises a fine grid-like structure arranged around the periphery. The deposit is shown on a considerably enlarged scale in Fig. 4. The conductor 42 comprises a single conductor arranged in zig-zag or back and forth fashion, whereby there is formed a succession of juxtaposed series-connected "bars." In this form of the invention the bars are radially disposed. The individual bars are connected at their ends by short connectors 43. The ends of the conductor are connected to terminals 44 which may be connected in any suitable way to slip rings. The deposition of the conductor may be effected in any desired way, as by evaporation of metal, such as aluminum in the desired pattern determined by a mechanical or photographic process, as will be understood by those skilled in the art.

The deposit on stator 32 is formed identically with the rotor and is not specifically shown in the drawings.

The principle of operation is identical to that described in Fig. 1 and need not be repeated for the structure shown in Figs. 2 and 3. The only difference is that the transformer action occurs between radially extending conductors instead of drum-wound conductors. By the metal deposition method it is, however, possible to secure a finer spacing of lines. Thus, with 3600 lines or bars in each conductor, which can be readily attained with disks having an outside diameter of 6 inches, the line spacing is six minutes of arc, and the angular spacing can be measured electrically to a precision of about one second of arc.

Since each conductor bar represents a scale index, it will be understood that, in the constructions described above, no direct measurement of absolute angular position can be made by any single reading. The aggregate or integrated large-scale motion of the rotor may be determined by counting the integral number of complete cycles through which the induced voltage passes. This counting can be carried out by suitable electronic equipment, as will be understood by those skilled in the art. Large scale angular measurement may be attained by the use of additional sets of bars with what may be termed "higher order spacing." Thus in Fig. 6 there is shown a unit which may be conveniently considered as a rotor unit having a deposit 46 of closely spaced lines similar to the lines 42 of Fig. 3. At a different radius is another conductor formed by deposit of connecting lines as indicated at 48, the latter having a wider spacing than the lines 46. The single conductor which comprises the lines 48 is brought out to independent terminals. The addition of higher order conductors may be carried as far as desired. Thus, there may be a still higher order conductor 50, with still wider spacing likewise brought out to independent terminals. The spacing ratio for successive orders is preferably the same and for convenience will usually be in multiples of 10. For example, the angular spacing of bars in conductor 48 may be 10 times, and that of the bars in conductor 50 may be 100 times, the angular spacing in conductor 46. As many spacing orders may be used as desired. For example, for direct reading in the decimal system, four sets of conductors might be used with 2, 20, 200, and 2,000 bars, respectively. The stator will be formed with identical conductors opposed to the rotor conductors. According to the principles heretofore described, each stator conductor is in inductive relation with the corresponding rotor conductor. It will be understood that the drawing is diagrammatic and is not intended to show any particular numerical arrangement.

The constructions previously described have been concerned with precision measurement of angles. The same principles are applicable to linear measurement. A linear device constructed according to the present invention is shown in Fig. 7. The form here shown comprises a lower block 52 and an upper block 54. The blocks are adapted for relative longitudinal sliding motion and to that end are provided with accurately finished engaging surfaces 56. Each block is provided with a single zig-zag conductor which for the bottom block is illustrated at 58. A corresponding zig-zag conductor 60 is shown for the upper block. The blocks may be of any suitable material such as glass or plastic and the conductors 58 and 60 may be deposited thereon by mechanical or photographic methods heretofore described. The conductors are brought out to suitable terminals shown at 62 and 64. A slight air gap is provided between the conductors of the two blocks, preferably by undercutting those portions of the block on which the conductors are deposited as indicated at 66. The undercut is necessarily exaggerated in the drawing and in practice will be no greater than that necessary to assure proper sliding operation of the blocks, namely, in the neighborhood of 0.005 inch or less.

The principles upon which the linear device operates are identical with those of the rotary device. For relative motion of the blocks through the pitch between two successive bars there is a half-cycle change in the electrical output. The electrical changes may be used to measure the relative motion between the blocks. It will be understood that because of end effects the maximum sensitivity of the linear apparatus occurs in the vicinity of complete opposition between the conductors 58 and 60. Upon substantial motion between the conductors, there is an overhanging effect at the ends, so that the opposed sections conductor are reduced. This effect reduces only the sensitivity of the apparatus and does not affect its precision.

It will be understood that although several forms of the invention have been shown, the invention is not limited to these precise constructions. For example, the term "bars" as used herein is not necessarily limited to straight members, since the invention comprehends any arrangement in which series-connected conductors of any shape, disposed in zig-zag fashion and with a precise angular or linear spacing, may be used. Furthermore, it will be understood that multiple windings may be used in a specified phase relationship, whereby a polyphase rotor or stator is obtained, for sense detection or other purposes, as will be understood by those skilled in the synchro art.

Having thus described the invention, I claim:

1. Apparatus for electrical measurement comprising two relatively rotatable members, a large number of series-connected conductor bars extending back and forth across said members and in directions generally perpendicular to the direction of relative movement, the bars being in accurately spaced arrangement, the bars of the two members having the same angular spacing, each bar of either member being in inductive relationship with only those bars of the other member that are immediately opposed thereto.

2. Apparatus for electrical measurement comprising two relatively movable members of non-magnetic material, a larger number of series-connected conductor bars extending back and forth across said members and in directions generally perpendicular to the direction of relative movement, the bars being in accurately spaced arrangement, the bars of the two members having the same spacing, each bar of either member being in inductive relationship with only those bars of the other member that are immediately opposed thereto.

3. Apparatus for electrical measurement of angles comprising two relatively movable members of non-magnetic material, a large number of series-connected conductor bars extending back and forth across said members, the bars being in accurately spaced angular arrangement, the bars of the two members being in inductive relationship and having the same angular spacing.

4. Apparatus for electrical measurement of angles comprising a rotor and a stator, the rotor comprising a plate of insulating material having a fine grid-like deposit of conducting material consisting of series-connected radial bars, the stator comprising a plate opposed to the rotor and having a similar grid-like deposit of series-connected connector bars with the same angular spacing, the bars of the rotor and stator being in inductive relationship.

5. Apparatus for electrical measurement comprising two relatively rotatable members, a large number of series-connected conductor bars extending back and forth across said members and in directions generally perpendicular to the direction of relative rotation, the bars being in accurately spaced arrangement, the bars of the two members having the same angular spacing, each bar of either member being in inductive relationship with only those bars of the other member that are immediately opposed thereto, said inductive relationship being non-ferromagnetic, and means for exciting the conductor bars of one member at high frequency.

6. Apparatus for electrical measurement comprising two relatively movable members of non-magnetic material, a large number of series-connected conductor bars extending back and forth across said members and in directions generally perpendicular to the direction of relative movement, the bars being in accurately spaced arrangement, the bars of the two members having the same spacing, each bar of either member being in inductive relationship with only those bars of the other member that are immediately opposed thereto, said inductive relationship being non-ferromagnetic, and means for exciting the conductor bars of one member at high frequency.

7. Apparatus for electrical measurement comprising two relatively rotatable members, a large number of series-connected conductor bars extending back and forth across said members and in directions generally perpendicular to the direction of relative movement, the adjacent bars of each member carrying the same current in opposite directions, the bars being in accurately spaced arrangement, the bars of the two members being in inductive relationship and having the same angular spacing.

8. Apparatus for electrical measurement comprising two relatively movable members, a large number of series-connected conductor bars extending back and forth across said members and in directions generally perpendicular to the direction of relative movement, the adjacent bars of each member carrying the same current in opposite directions, the bars being in accurately spaced arrangement, the bars of the two members being in inductive relationship and having the same spacing.

9. Apparatus for electrical measurement comprising two relatively rotatable members, a large number of series-connected conductor bars extending back and forth across said members and in directions generally perpendicular to the direction of relative movement, the adjacent bars of each member carrying the same current in opposite directions, the bars being in accurately spaced arrangement, the bars of the two members having the same angular spacing, each bar of either member being in inductive relationship with only those bars of the other member that are immediately opposed thereto.

10. Apparatus for electrical measurement comprising two relatively movable members, a large number of series-connected conductor bars extending back and forth across said members and in directions generally perpendicular to the direction of relative movement, the adjacent bars of each member carrying the same current in opposite directions, the bars being in accurately spaced arrangement, the bars of the two members having the same spacing, each bar of either member being in inductive relationship with only those bars of the other member that are immediately opposed thereto.

11. Apparatus according to claim 1 in which one of the members is drum shaped and the conductor bars of the two members extend in a direction parallel to the axis of the drum.

12. Apparatus according to claim 1 in which the rotor comprises a plate of insulating material having a large number of series connected radial conductor bars and the stator comprises a plate opposed to the rotor and has similar series-connected radial conductor bars.

13. Apparatus for electrical measurement comprising two relatively rotatable members, each member having a plurality of opposed conductors, each conductor having a large number of series-connected conductor bars extending back and forth across said members and in directions generally perpendicular to the direction of relative movement, the bars being in accurately spaced arrangement, the bars of the corresponding conductors of the two members having the same angular spacing, each bar of either member being in inductive relationship with only those bars of the other member that are immediately opposed thereto, the spacing between bars varying from conductor to conductor of each member to provide for measurement in different orders.

ROBERT S. CHILDS.

References Cited in the file of this patent

UNITED STATES PATENTS

| Number | Name | Date |
|---|---|---|
| Re. 22,139 | Case | July 21, 1942 |
| 459,610 | Desroziers | Sept. 15, 1891 |
| 526,064 | Wagemann | Sept. 18, 1894 |
| 617,375 | Voigt | Jan. 10, 1899 |
| 1,196,429 | Bruger | Aug. 29, 1916 |
| 1,565,206 | Ruzicka | Dec. 8, 1925 |
| 1,585,566 | Sindl | May 18, 1926 |
| 1,972,987 | Gardeen | Sept. 11, 1934 |
| 2,157,094 | Beyerle | May 9, 1939 |

OTHER REFERENCES

Publication: "Printed Circuit Techniques," November 22, 1948, page 57.